TELEVISION OPTICAL SYSTEM

Filed Nov. 20, 1956

2 Sheets-Sheet 1

INVENTOR.
John H. Roe
BY
[signature]
ATTORNEY.

July 24, 1962 J. H. ROE 3,046,334

TELEVISION OPTICAL SYSTEM

Filed Nov. 20, 1956 2 Sheets-Sheet 2

INVENTOR.
John H. Roe
BY
[signature]
ATTORNEY.

United States Patent Office 3,046,334
Patented July 24, 1962

3,046,334

TELEVISION OPTICAL SYSTEM

John H. Roe, Collingswood, N.J., assignor to Radio Corporation of America, a corporation of Delaware Filed Nov. 20, 1956, Ser. No. 623,344
6 Claims. (Cl. 178—7.2)

This invention relates generally to optical systems for use with image pickup tubes of the type incorporated in television camears and more particularly to optical systems for eliminating or substantially reducing undesired persistency of image signals from storage type pickup tubes. This is a continuation-in-part of my copending application Serial Number 395,027, filed November 30, 1953, and entitled TV Optical System.

When a stationary scene or object to be televised is fixedly focused on a storage type image pickup tube for a period of time, the signal output from the tube corresponding to that image persists for a relatively long interval after a change of scene. This effect is particularly noticeable in older tubes and is commonly referred to as "burning in" or "sticking," and has been previously described in an article entitled "Television Camera Tubes" by Janes, Johnson & Moore, starting on page 191 of the RCA Review of June 1949. Heretofore, in an attempt to avoid this sticking effect, the camera was constantly moved or panned in a slow oscillatory manner by the camera operator in a mechanical fashion.

Accordingly, it is an object of this invention to provide an improved optical system for storage type image pickup tubes which is effective to minimize the "burning in" or "sticking" of an image which is focused on the photocathode of the tube for an extended period of time.

It is another object of this invention to provide an improved automatic panning system for color television cameras to prevent "burning in" or "sticking" of the images focused on the pickup tube in which no objectionable amount of misregistration of the various color images occur.

In accordance with the invention a movable light refracting device is interposed in the camera optical system at some position intermediate the scene to be televised and the image pickup tube. The light refracting device may, for example, comprise a transparent glass plate or prism having at least one surface at an angle not perpendicular to the axis of the camera optical system. The refracting lens is cyclically moved as by imparting a relatively slow angular rotation, so that the light rays passing therethrough are correspondingly cyclically displaced on the photosensitive electrode of the pickup tube.

It is therefore another object of this invention to provide an improved optical system for a television camera of the type incorporating a storage type pickup tube which is effective to impart a slight movement of an otherwise stationary light image at the photocathode of the tube to prevent "burning in" of the image.

The novel features that are considered characteristic of this invention are set forth with particularity in the appended claims. The invention itself, however, both as to its organization and method of operation, as well as additional objects and advantages thereof, will best be understood from the following description when read in connection with the accompanying drawings, in which:

Figures 1, 2:
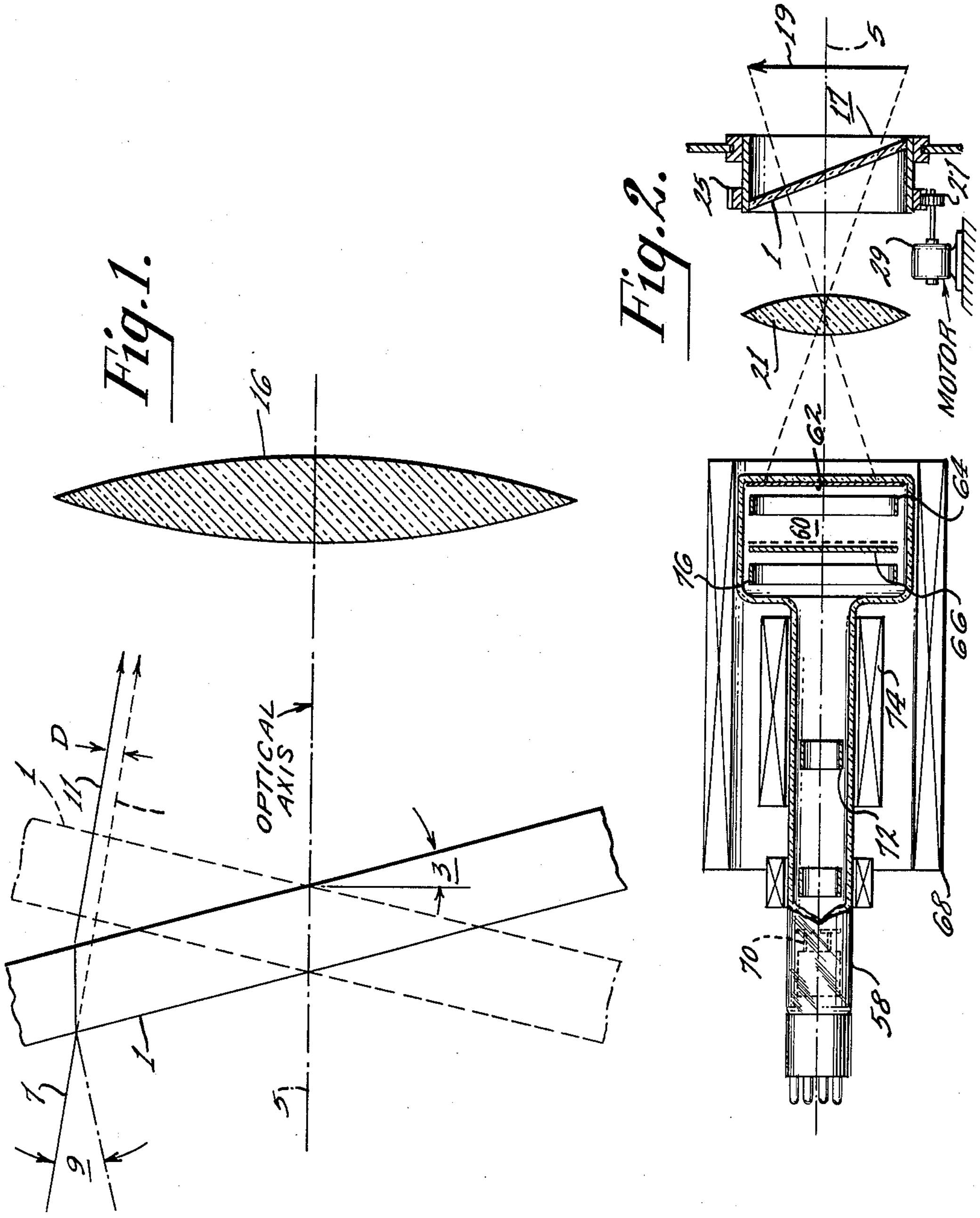
FIGURE 1 is a diagram of the glass plate showing the relative positions when undergoing a rotating motion and the displacement of the incident light relative thereto.
FIGURE 2 shows an image pickup tube and a cylindrical housing within which the optical glass plate is mounted.

Referring to the drawings wherein like reference characters are used to designate similar components throughout and particularly to FIGURES 1 and 2, an image pickup tube 58 of the storage type such as an image orthicon, includes an image section 60 containing a semi-transparent photocathode 62 on the inside of the face plate, a grid 64 to provide an electrostatic accelerating field, and a target 66 which consists of a thin glass disc with a fine mesh screen very closely spaced to it on the photocathode side. Focusing is accomplished by means of a magnetic field produced by an external coil 68, and by varying the photocathode voltage. Light from a scene to be televised is picked up by an optical lens system and focused on the photocathode 62 which emits electrons from each illuminated area in proportion to the intensity of the light striking the area. The streams of electrons are focused on the target 66 by the magnetic and electrostatic fields.

On striking the target 66 the photoelectrons cause secondary electrons to be emitted from the glass leaving a pattern of positive charges corresponding to the object or scene to be televised. Because the target 66 is a very thin sheet of partially conducting glass, the charge image is also "seen" on the scanned side of the target by the scanning beam.

The electrons are emitted from a gun 70 through a small defining aperture and are focused into a fine beam by means of the magnetic field of the external focusing coil 68 and the electrostatic field of a grid 72. Magnetic deflection by means of the coils 74 causes the beam to scan the target. A grid 76 serves to adjust the shape of the decelerating field between the grid 72 and the target 66 in order to obtain uniform landing of the scanning beam over the entire target area. The electrons stop their forward motion at the surface of the glass and are turned back, except when they approach the positively charged portions of the pattern and are deposited on the glass. This deposition leaves the glass with a negative charge on the scanned side and a positive charge on the photocathode side. These charges should neutralize each other by conductivity through the glass in less than the time of one frame.

The electrons turned back at the target form the return beam which has been amplitude modulated by absorption of electrons at the target in accordance with the charge pattern. The returning modulated beam strikes the first dynode of an electron multiplier which as a result, emits secondary electrons. These secondaries in turn are drawn down through a series of multipliers of high secondary emission which increase the signal many times.

The operation of the tube makes several demands on the glass target. The photoelectrons striking the image side of the glass through the mesh openings give rise to secondary electrons that are collected by the mesh. In order to obtain good resolution for such a storage time, the lateral leakage or leakage between elements is kept as low as possible, by the use of a high-resistance glass and by the use of a target as thin as possible. When the scanning beam approaches the scanned side of an element that has been charged, the beam "sees" the same potential as that of the charged side because of the thinness of the target. Electrons are deposited from the beam on the target until the potential returns to nearly the equilibrium potential under the beam when no light is present. After the beam leaves the element, the positive charge on the image side and the negative charge on the scanned side must combine in less than a frame time or 1/30th second, otherwise, a "sticking picture" will occur. In tubes which have had extensive use, the continued bombardment of the glass semiconductor by relative high velocity photoelectrons causes the resistivity of the glass to change.

Thus, if the camera is stationary and the tube "looks at" a strongly lighted area for a period of time (on the order of a minute), a sticking picture of the same or opposite polarity can develop because as mentioned above, the inability of the glass target to permit rapid neutralization of the charges accumulated thereon.

In accordance with the invention as illustrated in FIGURE 1, an optically transparent plate 1 having a finite thickness is tilted at an angle 3 from an optical axis 5. An incident ray of light penetrating the entrance surface of the plate 1 at some angle 9 will be refracted to change its direction of travel through the glass plate 1 due to the difference in the indices of refraction of glass and air. As the light ray leaves the glass plate 1 it is again bent or refracted so that it travels along a path indicated by the solid line 11 which is parallel to, but displaced from the original path of the light ray.

Rotation of the glass plate 1 by 180° about its optical axis causes the glass to be in a position orthogonal to the incident ray of light 7. In accordance with familiar refractive properties of glass, whenever an incident ray of light is perpendicular or normal to the glass surface at the point of penetration, the direction of the light ray relative to its incident direction does not change, but rather emerges from the opposite surface of the glass at an angle normal to the surface and along an extension of the path of the original incident ray. Accordingly, in the dotted position of the glass plate 1, the light ray after passing through the plate follows the path which is indicated by the dotted line 13 which is parallel to but displaced from the path 11 by some distance D. This displacement D continually varies as the glass plate 1 rotates from 0 degree to 180° about its optical axis 5. In this manner the image is constantly being shifted in an oscillatory fashion producing the desired effect of panning the camera, to thereby avoid the undesirable effect of sticking.

The displacement depends on the thickness of the glass plate 1 and its angle of tilt with respect to the optical axis 5. The rate at which the displacement takes place is a function of the angular velocity of the glass plate with respect to the optical axis 5 of the camera lens system.

FIGURE 2 shows a simplified optical system for an image pickup tube 58 including a cylindrical housing 17 within which the optical glass plate 1 is mounted. The glass plate 1 within the cylindrical housing 17 is mounted at an angle with respect to the optical axis 5. Light from an object 19 is imaged by an objective lens 21 onto the photosensitive cathode 62 of the image pickup tube 58. This light from the object source 19 is intercepted by the glass plate 1 so that as the housing 17 is rotated, the light rays emanating from the object source 19 are made to undergo an oscillatory displacement effecting an image displacement on the photosensitive cathode 62. The housing 17 has about its periphery a number of teeth 25 which are engaged by a small pinion gear 27 driven by an electric motor 29 at some fixed speed of rotation.

Figure 3:
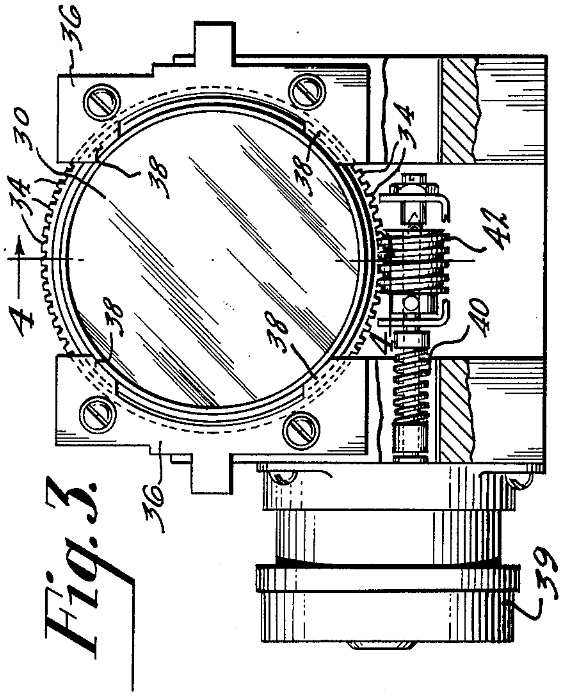
FIGURE 3 is a front view of an optical system for use with storage type image pickup tubes which operates to impart a slight movement of the light image impinging on the photocathode of the image tube.
Figure 4:
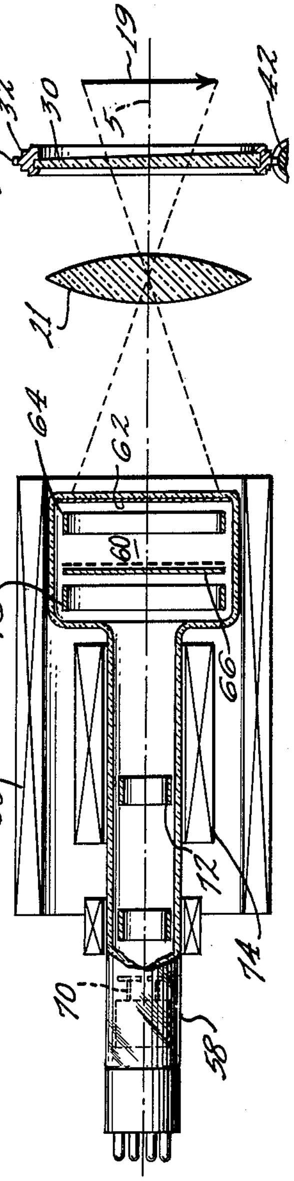
FIGURE 4 is a sectional view of the optical system shown in FIGURE 3 taken on the section lines 4—4.

Referring to FIGURES 3 and 4, a prism 30 which comprises a glass disc having one surface ground at an angle to the other surface is positioned on the optical axis 5 which may comprise the optical axis of a television camera. As shown in FIGURE 4, the prism is disposed between the object 19 to be televised and the image pickup tube. Although the prism is shown as positioned in front of the objective lens 21, it could as well be positioned between the objective lens and the pickup tube. The glass of this prism may be treated with a low reflection process, if desired, to minimize ghost images that originate at its surfaces. The prism 30 is vertically mounted in an annular gear ring 32 so that the surface thereof on the side facing the object to be televised is perpendicular to the optical axis 5, the other surface of course being at an angle to the optical axis. Since the prism is vertically mounted instead of tilted as is the optical plate illustrated in FIGURES 1 and 2, the longitudinal space required in the optical system is substantially reduced. This feature is of prime significance in the relatively complicated optical systems used in television cameras and particularly color cameras. The gear ring 32 has a plurality of radially extending gear teeth 34 and is mounted for rotation in a suitable guide block 36 of nylon or the like which provides a plurality of supporting tabs 38 which engage the ring and provide bearing surfaces therefor.

A driving motor 39 mounted at one side of the optical system is coupled through a flexible coupler 40 to a worm gear 42. The flexible coupler 40 prevents binding of the motor armature without the maintenance of rigid tolerances and excessive assembly adjustment time. The worm gear 42 is positioned to engage the teeth 34 of the drive gear ring 32 so that upon application of a suitable energizing potential to the motor 29, the drive gear ring 32 and the prism 30 supported thereby are rotated slowly on the optical axis 5. Light from the object source focused on the photocathode 62 passes through a slowly rotating prism 30 to effectuate a cyclical image displacement on the photosensitive cathode 62.

Figure 5:
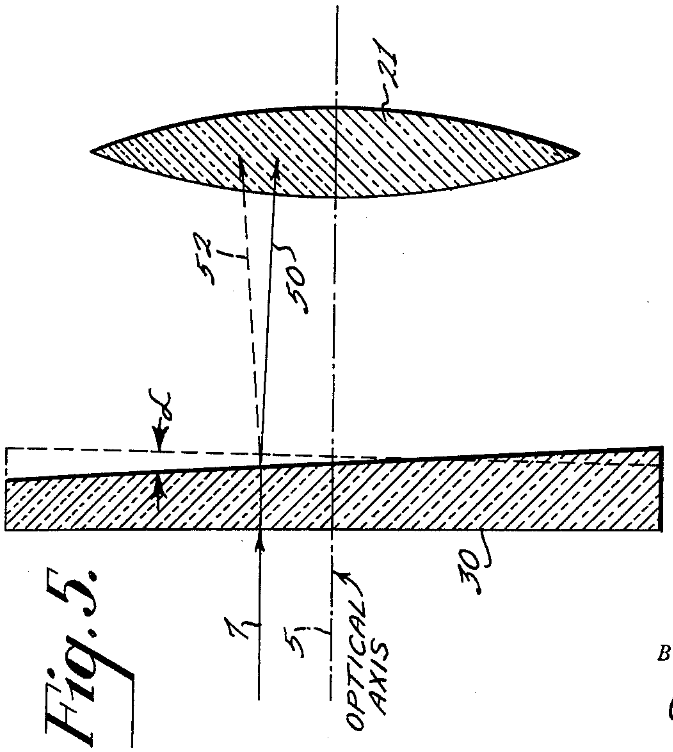
FIGURE 5 is an enlarged diagramatic view of the prism used in the optical system shown in FIGURES 3 and 4 illustrating how light beams impinging thereon may be moved as the prism is rotated.

The reason for this image displacement can be seen with reference to FIGURE 5 which shows an enlarged side view of the prism. It is to be understood that the light rays 7 from the object source are substantially parallel and impinge at right angles to the vertical surface of the prism. As mentioned above, the direction of the light rays is not changed under these circumstances and, therefore, the beam continues on in the same direction through the prism. Due to the slight angle of the exit surface of the prism, the light rays do not strike at right angles and are refracted or bent a slight amount, and emerge from the prism as parallel rays which have been deviated in direction along a path indicated by the solid line 50.

When the prism has been rotated 180° on its axis as shown in dotted lines, the angle of incidence of the light ray 7 on the exit or refracting surface of the prism 30 changes causing the light ray to follow the refracted path indicated by the dotted line 52. The continued rotation of the prism 30 causes the incremental portions of the image at the photocathode to rotate in small circular orbits, or effectively moves the image cyclically a distance sufficient to prevent "sticking" or "burning in" of the image in the pickup tube.

In practice, it has been found that a prism of 2.3 inches in diameter having a maximum thickness of .2 inch with a refracting edge ground to an angle of 0° 22 minutes gave excellent results. It has been computed that such dimensions of the prism provide an orbit about which the incremental images revolve, of about 1/64".

As mentioned above, it has heretofore been proposed that electrical means such as a magnetic field be used to cyclically move the image focused on the photocathode of the pickup tube. Such means when used with color television systems cause serious misregistration problems with respect to the various color images. In the optical system of the invention, a negligible amount of misregistration occurs because of the greater bending or refraction of the shorter wave lengths (blue limit of the visible spectrum) than the longer wave lengths (red limit of the visible spectrum). This amount of misregistration may be easily tolerated in existing color television optical systems, but if desired may be reduced by reducing the angle of the refracting surface of the prism 30. However, with a smaller angle of the refracting surface, the amount of movement of the image with rotation of the prism is likewise reduced.

The optical system described provides a simple and efficient means for preventing "sticking" or "burning in" of an image on a storage type image pickup tube by providing a cyclically movable refraction device for the light emanating from the image object to cyclically move the image focused on the image pickup tube.

What is claimed is:

1. For use with a television image pickup tube having an image section including a photosensitive electrode and susceptible to burn-in of a complete image projected simultaneously on said photosensitive electrode by an optical system for said tube, the combination of means providing a light refracting plate adapted to be interposed between said photosensitive electrode and an object from which said image is produced, the plane of said plate being positioned so that at least one surface thereof is at an angle other than normal to the axis of said optical system and means for cyclically moving said light refracting plate relative to said optical axis to correspondingly circularly displace said complete image projected therethrough only an amount of the order of the visual resolution of said image and thereby prevent burn-in of an image projected on said photosensitive electrode.

2. For use with a television image pickup tube, having an image section including a photosensitive electrode and susceptible to burn-in of an image projected on said photosensitive electrode by an optical system for said tube, the combination of means comprising a light refracting plate having a pair of parallel surfaces interposed between said photosensitive electrode and the object from which said image is produced, means providing a housing for supporting said light refracting plate so that the surfaces thereof are at an angle other than normal to the optical axis between said object and said photosensitive electrode to refract light passing therethrough, and means comprising an electric motor for continuously rotating said housing and said light refracting plate to cyclically displace said image projected on said photosensitive electrode and prevent burn-in of said image.

3. For use with a television camera including a storage type image pickup tube having an image section susceptible to burn-in of an image projected on said tube for a predetermined period of time and having an optical system for focusing an image of an object to be televised on said pickup tube, a prism interposed between said image pickup tube and the object from which said image is produced, said prism having one surface adapted to be positioned in a plane perpendicular to the optical axis of said optical system and another surface adapted to be positioned in a plane which intersects said optical axis at an angle other than normal, and means for continuously rotating said prism to correspondingly move an image projected therethrough onto said tube and thereby prevent burn-in of an image on the image section of said tube.

4. For use with a television camera including a storage type image pickup tuge having an image section susceptible to burn-in of an image projected on said tube for a predetermined period of time and having an optical system for focusing an image of an object to be televised on said pickup tube, a prism interposed between said image pickup tube and the object from which said image is produced, said prism comprising a low reflecting glass disc having oppositely disposed surfaces lying in intersecting planes, an annular rotatable gear ring having radially extending gear teeth for supporting said prism so that one of said surfaces is perpendicular to the optical axis of said optical system and the other surface is at an angle other than normal to said optical axis, an electric motor having a rotatable drive shaft, gear means affixed to said drive shaft and engaging the teeth of said gear ring in driving relation to continuously rotate said gear ring when power is applied to said electric motor and thereby cyclically adjust the position of an image projected through said prism onto said image pickup tube to prevent burn-in of an image in the image section of said tube.

5. An optical system as defined in claim 4 wherein the angle between said intersecting planes is of the order of zero degrees twenty-two minutes.

6. In apparatus to be used with a light sensitive camera arranged to convert an optical image of varying pattern into electrical energy representative of the said image, a camera tube, camera tube electron beam focusing means associated with said camera tube, a light sensitive surface in said camera tube, a light beam influenced by said varying pattern of said image and arranged to fall on said light sensitive surface to establish thereon said optical image, and means for cyclically altering the position of the optical image on the light sensitive surface of the camera tube to prevent damage to said surface by fixed and continued excitation thereof.

References Cited in the file of this patent

UNITED STATES PATENTS

| | | |
|---|---|---|
| 1,631,021 | Dowling | May 31, 1927 |
| 2,315,621 | Ives | Apr. 6, 1943 |
| 2,405,731 | Beggs et al. | Aug. 13, 1946 |
| 2,686,452 | Bentley | Aug. 17, 1954 |
| 2,881,248 | Wilner | Apr. 7, 1959 |

FOREIGN PATENTS

| | | |
|---|---|---|
| 394,285 | Great Britain | June 22, 1933 |